United States Patent [19]

Drugeon et al.

[11] Patent Number: 4,488,453
[45] Date of Patent: Dec. 18, 1984

[54] BICYCLE PEDAL FOR COUPLING A SHOE IN PRESET POSITION, AND A CYCLIST'S SHOE FITTED TO SAID PEDAL

[76] Inventors: Jean-François Drugeon, 1 bis rue Maleville; Jean Badersbach, Castellou - Planiolles, both of 46100 Figeac, France

[21] Appl. No.: 348,164

[22] Filed: Feb. 12, 1982

[30] Foreign Application Priority Data

Feb. 13, 1981 [FR] France .................................. 81 03039
Jul. 8, 1981 [FR] France .................................. 81 13811

[51] Int. Cl.³ ............................................. G05G 1/14
[52] U.S. Cl. .................................. 74/594.6; 74/594.7; 36/131
[58] Field of Search ........................... 74/594.6, 594.7; 36/131

[56] References Cited

U.S. PATENT DOCUMENTS 550,409 11/1895 Hanson .............................. 36/131 X
4,377,952 3/1983 Gamondes ........................ 36/131 X

FOREIGN PATENT DOCUMENTS

2432427 4/1980 France .................................. 36/131
2442175 6/1980 France .

Primary Examiner—Leslie A. Braun
Assistant Examiner—Frank McKenzie
Attorney, Agent, or Firm—Shlesinger, Arkwright, Garvey & Fado

[57] ABSTRACT

The invention concerns a bicycle pedal of the type comprising coupling means 3, 4, 5 designed to cooperate with conjugate means of a shoe. This pedal is provided with adjusting means making it possible to fix the shoe for that position which is the most appropriate for the body of the user. To that end the pedal is supported on the pedal shaft by the agency of two intermediate pieces which are mounted in movable manner on one hand with respect to each other and on the other hand with respect to the pedal shaft and the pedal body so as to allow a transverse translational motion ($D_T$) of said pedal body, a longitudinally translational motion ($D_L$), a pivoting motion ($R_V$) about an orthogonal axis V and possibly a pivoting motion ($R_L$) about the longitudinal axis. Locking means to lock the two movable pieces into the desired position are provided.

16 Claims, 26 Drawing Figures

BICYCLE PEDAL FOR COUPLING A SHOE IN PRESET POSITION, AND A CYCLIST'S SHOE FITTED TO SAID PEDAL

The invention concerns a pedal for a bicycle or similar conveyance of the type comprising coupling means to operate in concert with conjugate means arranged underneath a shoe for the purpose of ensuring fixing the shoe onto the pedal for pedaling while also permitting disengagement as needed, the invention also extends to a shoe fitted to couple to said pedal.

Devices for fixing a shoe to a pedal are known, which permit eliminating the conventional straps that are difficult to put into place and which are sources of danger due to the difficulty in disengagement they present. The properties demanded on these fixation devices essentially are to allow easy and quick coupling, to ensure sound joining of foot to pedal and to satisfy the required safety conditions, in particular to allow through a releasing action of the coupling means a deliberate disengagement of the shoe when required and an automatic disengagement under an impact due to a fall or accident. A device meeting such requirements has been described in the French patent application 78.33775 filed on the Nov. 24, 1978 in the name of the applicants and published on June 20, 1980 under number 2.442.175.

As regards devices of that type, the shoe is rigidly fixed to the pedal in a single position without the possibility of a relative motion. Under these conditions it is important that for each user this position correspond to the most appropriate one permitting him to apply his pedaling exertions in the optimal conditions.

The present invention has as its object to create a pedal of the above cited type that can be adjusted beforehand by the user to adapt it perfectly to his needs and to allow him to achieve a relative position between foot and pedal which is optimal.

Another object of the invention is to make it possible to carry out said adjustments in a simple, convenient and rapid manner.

Another object is to improve the comfort of the pedaling motions by allowing for a small elastic displacement of the foot with respect to the pedal without there being a danger of release as regards the typical pedaling efforts.

Another object is to provide the user with the possibility of eliminating this flexibility where appropriate to achieve a rigid fixation of the foot to the pedal while retaining the release safeties of the basic device.

Another object is to facilitate putting the shoe in place and coupling it to the pedal.

Another object is to provide a lightweight pedal of the same order of weight as the conventional ones.

To simplify the description and to make the text clearer, several terms used hereafter are defined as follows:

support plane: the plane parallel to the support side of the pedal and containing the coupling means (after coupling, the shoe sole will be positioned approximately parallel to this support plane), transverse axis (T): the axis coinciding with the pedal shaft (this axis extends from one side of the pedal to the other), longitudinal axis (L): the axis located in the support plane and approximately orthogonal to the transverse axis (T), (this axis extends from the front to the rear of the pedal, passing approximately through its center), orthogonal axis (V): this axis is approximately perpendicular to the support plane, passing approximately through the center of the pedal.

[Be it noted that for an average adjusted position, the transverse axis (T), the longitudinal axis (L) and the orthogonal axis (V) are generally orthogonal two-by-two; this no longer applies to other adjustment positions where the orientations of the longitudinal axis (L) and of the orthogonal axis (V) may have been made to vary, on one hand with respect to each other, on the other hand with respect to that of the transverse axis (T) taken as the reference].

The pedal for a bicycle or similar conveyance of the invention comprises an assembly, called the pedal shaft, generally consisting of a tubular spacer held by ball bearings on a transverse shaft, and a pedal body forming a support and provided with coupling means capable of acting in concert with conjugate means arranged underneath a shoe. In the present invention, the pedal body is held by the pedal shaft by the action of at least two intermediate pieces, one of them borne by said pedal shaft, the other by the first and in turn bearing the pedal body; said pieces are mounted in movable manner, on one hand with respect to each other and on the other hand respective as regards the pedal shaft and the pedal body, so as to allow a transverse translational motion ($D_T$) of said body along the transverse shaft (T) of the pedal, a longitudinal translational motion ($D_L$) of the body along the longitudinal axis of the pedal and a pivoting motion ($R_V$) of said body along the orthogonal axis (substantially orthogonal to the support plane); moreover the pedal is provided with locking means permitting it to lock into a selected position on one hand the first movable piece with respect to the pedal shaft and on the other hand the second movable piece with respect to the first, and lastly the pedal body with respect to said second movable piece.

In this manner the user can adjust the position of his foot on the pedal by adjusting the pedal body and hence the coupling means tied to same, by a combination of the three independent adjustments which are provided; first he frees the locking means and thereupon undertakes on one hand the positioning of the first piece with respect to the tubular spacer and on the other hand the positioning of the second piece with respect to the first, lastly the positioning of the pedal body with respect to this second piece; once these adjustments have been carried out, he again locks the locking means, whereby he once more enjoys a perfectly fitted pedal.

In another characteristic of the invention, the above cited two movable pieces are mounted in such a manner as to permit a fourth motion ($R_L$) consisting of a pivoting motion of the pedal body about the longitudinal axis (L). This complementary adjustment in an accurate manner allows, regardless of the body structure to the user, to impart the ideal position to the foot for cycling and is desirable for pedals for professionals or enlightened amateurs.

In a preferred embodiment, the pedal is designed in the following manner:

the first moving piece, called the moving core, is mounted in transversely sliding manner along the pedal shaft and is provided with swiveling means about the orthogonal axis (V), the second moving piece, called the moving sleeve, is mounted in pivoting manner about the swiveling means of the core and is provided with longitudinal translation guide means, the pedal body is mounted in longitudinally sliding manner along the guide means of the moving sleeve.

In the case cited previously wherein the pedal is provided with a fourth adjustment motion, the sleeve guide means consist of fore and rear swivel means borne by this sleeve, the pedal body being mounted on its swivel means in such a manner as to be capable of sliding longitudinally along them and to pivot around them.

The preferred structure described above allows making a lightweight and compact pedal; in order to reduce its weight still further, the two movable pieces can be made of a lightweight alloy, in particular a magnesium alloy.

Moreover, to assure by simple steps to have firm locking members: a first member allowing on one hand to lock into a desired transverse position the core along the pedal axis, and on the other hand to lock the sleeve on the core in a desired angular position arpund the orthogonal axis (V), and a second locking member permitting to lock the pedal body on the swivel means of the sleeve, on one hand into a desired longitudinal position and on the other hand into a desired angular position around the longitudinal axis (L).

Furthermore, the coupling means of the pedal preferably are of the type comprising two moving coupling jaws located to the rear and above the pedal body, a mechanism with elastic means and fitted to move these jaws toward a coupling position and to permit their sideways retraction by means of a transverse thrust, and a fixed coupling jaw located at the fore of the pedal body to form a triangulated coupling system with the two moving jaws at the rear.

In another characteristic of the invention, the above cited mechanism acting on the rear jaws comprises two springs of different compliances and mounted in such a manner that the more compliant spring will act first on the jaws and allows these to perform a low amplitude and pivoting motion due to a weak transverse force, and that the stiffer spring acts next on said jaws to allow their pivoting motion for the release under a higher transverse force.

In this manner, the more flexible spring permits a slight transverse displacement of the foot which increases the ease of pedaling without harming the proper position of the foot because the magnitude of this displacement is restricted by the action from the stiffer spring; if need be, a higher transverse force, in particular directed externally, compresses the stiffer spring and frees the foot.

Furthermore, the device is preferably provided with control means to neutralize the action of the softer spring to achieve where appropriate a rigid connection between the shoe and the pedal; this rigid connection is desirable in some instances, in particular when sprinting in races requires giving up the pedaling comfort for rigidity and precision in keeping the foot on the pedal.

Also the invention relates to a cyclist shoe to be used in concert with a three-jaw pedal of the type described above; this shoe underneath its sole comprises one forward coupling flange and two rear coupling flanges of contours adapted to the fore and rear jaws of the pedal and located at the three apices of a triangle of cooperate with said jaws.

In a characteristic of the invention to facilitate the emplacement and the engagement of the shoe on the pedal, said shoe furthermore comprises underneath its sole two guide flanges diverging on either side of the forward coupling flange toward the rear coupling flanges to guide the two rear pedal jaws when the emplacement takes place, so that these jaws arrive opposite the coupling flanges with which they are meant to cooperate.

The invention having been exposed in its outlines, other characteristics, purposes and advantages of this invention will become manifest in relation to the description below and the attached drawings illustrating in non-limiting manner an embodiment of the invention: these drawings are an integral part of the present description.

The illustratively shown pedal of FIGS. 1 through 11 comprises a pedal body made of two pieces 1 and 2 by molding a plastic such as a polyamide and reinforced by means of glass or carbon fibers; the first part 1 forms the main component of the body and comprises a fore portion 1a and a rear portion 1b joined by an upper plate 1d and by spacer means such as 1c which curve downward and extending at the lower pedal part; the rear part 1b consists of a lower turn extending over the entire width of the body.

Figures 1, 1A:
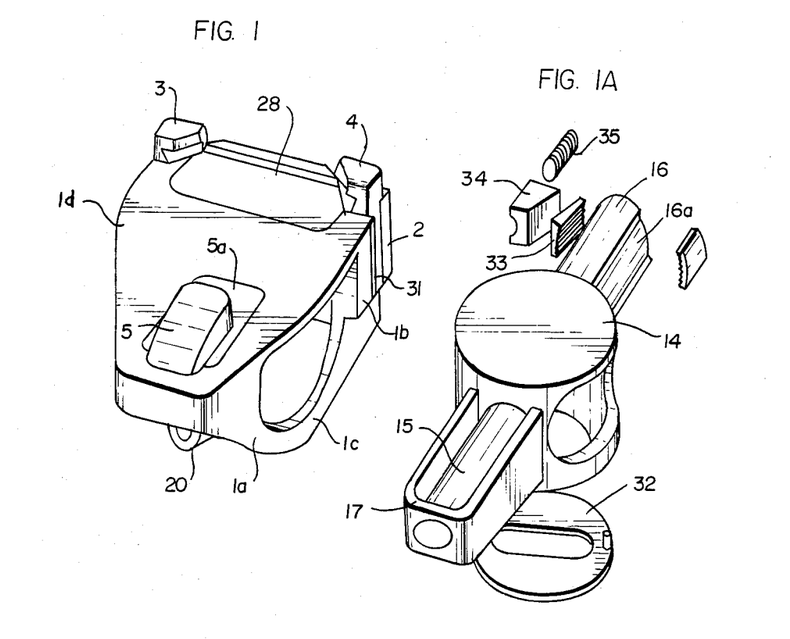
FIG. 1 is a perspective view of the body of the pedal of the invention.
FIG. 1a is an exploded schematic perspective view of the sleeve of the invention.

To the rear of the part 1, the second part of the body is fixed by two screws 36; this second part consists of a plate 2 wherein is housed a mechanism 6 which will be described further below. This mechanism elastically acts on two rear pivoting jaws 3 and 4 to permit them a sideways retraction under a transverse push. At the fore, the body comprise a forward jaw 5 clamped into base 5a of the part 1 when this part was molded; further, the body is provided with a perforated lug 20 to keep it in place.

The fore jaw 5 (made of stainless steel) consists of a stud with a coupling notch opening to the rear and the inside of the pedal. The rear jaws 3 and 4 (also made of stainless steel) hinge about small bars 3a and 4a extending them downward and around longitudinal shafts 30 whereby they may retract sideways; the small bars 3a and 4a are housed between the part 1 and the rear plate 2 of the body; at their upper ends projecting above the body, the jaws 3 and 4 are provided with coupling notches of which the contact surfaces are oblique to the longitudinal direction.

In this manner the three jaws form a triangular coupling system capable of perfectly keeping in place a shoe provided with conjugated means while still allowing its disengagement in case of need.

Be it noted that the rear plate 2 is fixed to the back of the body 1 with the sandwiching of at least on thin rear shim 31 for compensating the wear; each shim is in the form of a small removable plate designed to be placed and clamped between the rear plate 2 and the rear portion 1b of the body; this or these shim(s) allow(s) adjusting the longitudinal position of the two rear jaws with respect to the fore jaw and thereby permit(s) to readjust accurately the distance between these jaws following wear (by removing one or more shims).

Further, in the example shown, the pedal body is supplemented at the surface by a rear plate 28 made of stainless steel that can be bonded into a rear notch of the pedal.

Figure 3:
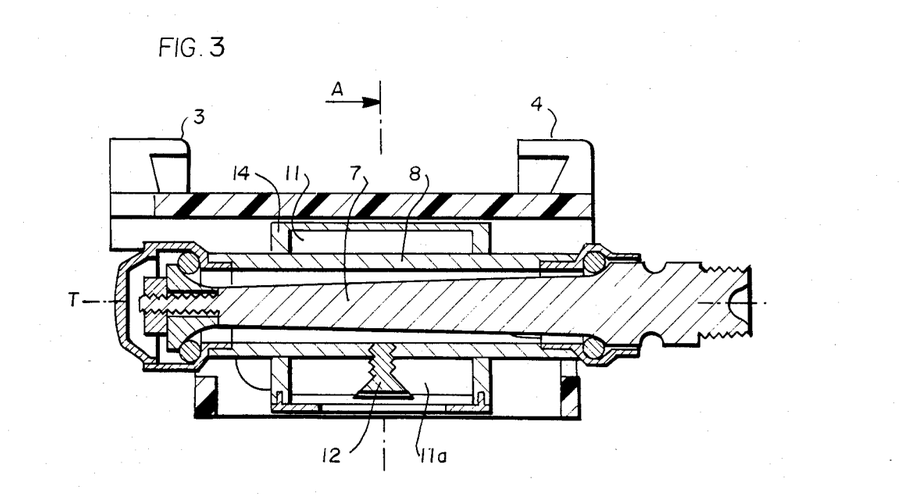
FIG. 3 is a cross-section in a plane B through the axis of the pedal and on a larger scale.
Figure 4:
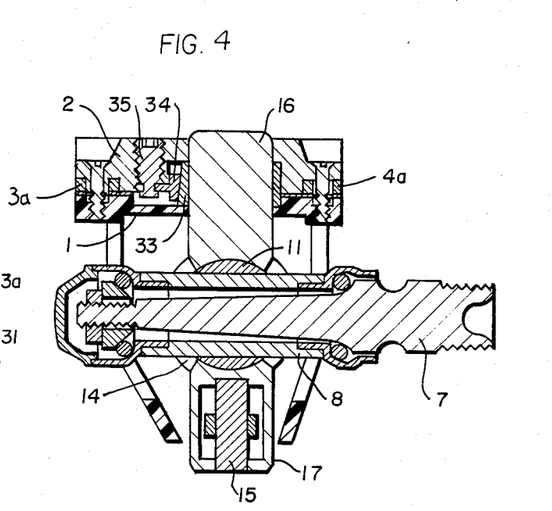
FIG. 4 is a section through a plane C parallel to the support plane and passing through the pedal shaft.
Figure 4A:
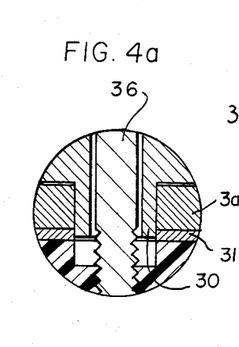
FIG. 4a is an exploded cross-sectional view of the pivoting means shown in FIG. 4.

Also, the pedal body (1,2) by means of adjusting members described herebelow is borne by a pedal shaft 7 of a conventional type and defining the transverse axis T taken as reference; this shaft bears a tubular spacer 8 which moves on it by two ball bearings such as 9 and which are located at both sides of said shaft; the tubular spacer 8 is supported by the external races of these ball bearings so as to rotate as required about the transverse axis T.

Figure 1B:
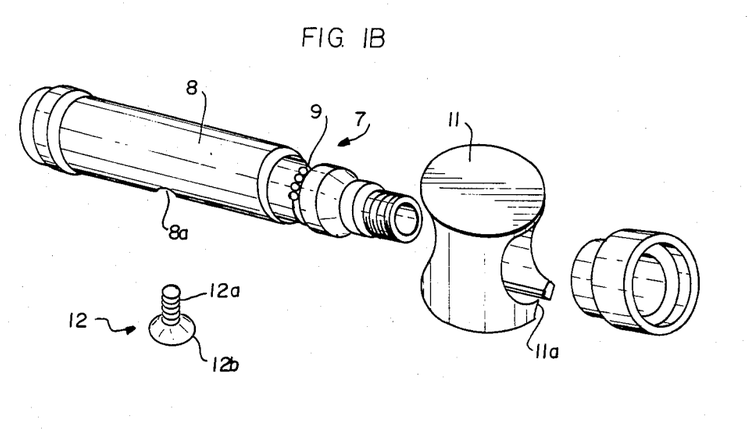
FIG. 1b is a schematic exploded perspective view of the core piece and spacer of the invention.

The tubular spacer 8 bears a first moving piece 11 called the core which is designed so it can slide along this spacer (motion $D_T$). This core 11 is in the general shape of a cylindrical block with its axis the orthogonal axis V, and comprises a cylindrical aperture with a transverse axis T through which passes the tubular spacer 8; the core 11 is provided at its base with a transverse slit 11a of which the edges are oblique and flare downward.

The core 11 bears a second moving piece called the sleeve 14 which comprises a hollow cylindrical element designed to cap said core and with oblong slots to pass the tubular spacer 8. The outer cylindrical surface of the core thus acts as a swivel means about the orthogonal axis V, imparting to the sleeve 14 the capability to pivot around this axis (motion $R_V$).

The sleeve 14 moreover comprises fore and rear swivel shafts 15 and 16 resp. which are borne by its longitudinal element and which extend along the longitudinal axis L.

Figure 2:
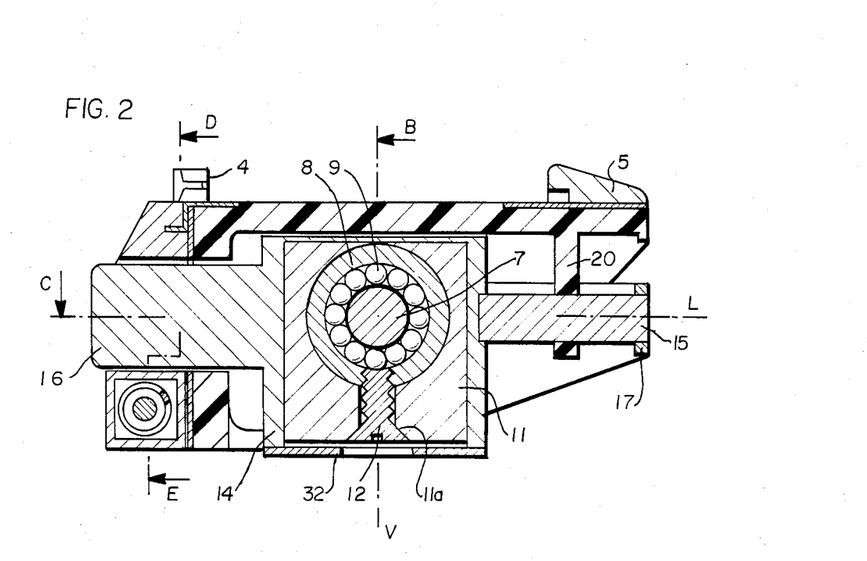
FIG. 2 is a section through a longitudinal plane A and on a larger scale of said pedal.

The fore swivel shaft 15 in this example consists of a shaft fixed in particular by bonding on the cylindrical element 14 of the sleeve and on an extension 17 provided at the fore of this sleeve. This swivel shaft 15 is engaged in the perforation of the lower lug 20 of the body in order to support this body and to guide it in longitudinal translation and in rotation about the longitudinal axis L.

The rear swivel shaft 16 supports the rear portion 1b of the body and guides it along and around the longitudinal axis L. For that purpose this rear portion 1b is perforated by an aperture crossed by said rear swivel shaft 16. This swivel shaft 16 furthermore is provided with two lateral cylindrical sectors such as 16a which are arranged somewhat in recess and as shall be shown further below permit locking the body with respect to said swivel shaft 16.

Moreover the pedal comprises a first locking member to lock on one hand the core 11 onto the tubular spacer 8 and on the other hand the sleeve 14 onto said core 11.

This member comprises a screw 12 provided with a stem 12a screwed into the tubular spacer 8 which is provided to that end with a threaded hole 8a, said screw 12 further comprising a conical head 12b housed in the transverse slit 11a of the core. The screw head 12b thus allows spreading apart the two parts of the core (located either side of the slit 11a) and to cause a radial expansion of the core which ensures locking it inside the sleeve 14 in a desired angular position around the orthogonal axis (V). Also, the screw 12 ensures fixing the core 11 onto the spacer 8 in the desired transverse position along the axis T.

The core 11 and the sleeve 14 advantageously are made of a magnesium alloy so as to achieve low weight. In this case a steel insert is preferably screwed into the spacer 8 to provide it with a threaded hole 8a subject to little wear. Again, the sleeve 14 can be closed at its base by a lid 32 snapped into position underneath it and provided with an aperture providing access to the screw 12.

The pedal furthermore comprises a second locking member to lock the pedal body 1 with respect to the rear swivel shaft 16 of the sleeve 14.

This member comprises two locking wedges such as 33, a clamping wedge 34 pressing by an oblique surface against one of the locking wedges, and a control screw 35 for this clamping wedge.

The locking wedges 33 are provided with fluted circular surfaces applied on either side of the rear swivel shaft 16 in the recessed circular sectors 16a; the screw 35 moved in one direction or the other causes a clamping or loosening effect on the swivel shaft 16 between the two locking wedges; in this manner it is possible to release the pedal body to put it into a desired position along and around the longitudinal axis L and to lock it thereupon in this position.

Figure 5:
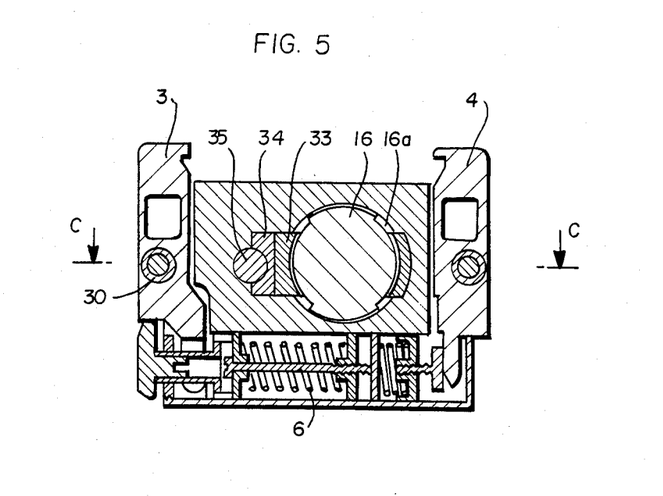
FIG. 5 is a cross-section along a broken line D,E.
Figure 6:
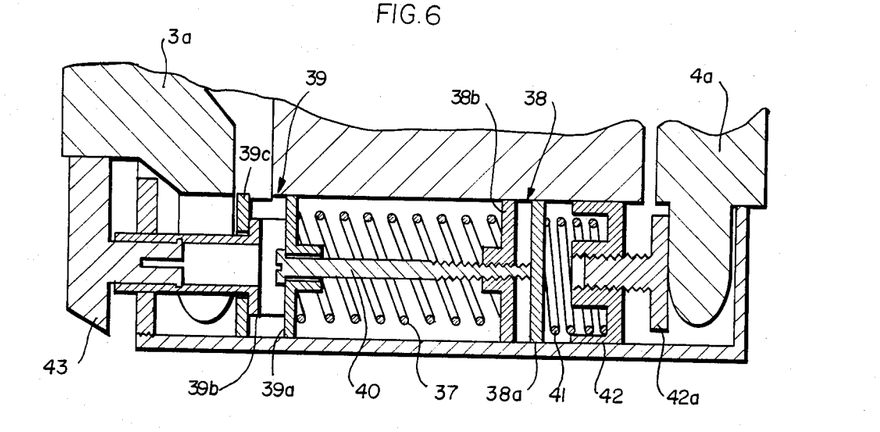
FIG. 6 is an enlarged-scale view of part of FIG. 5.
Figure 7:
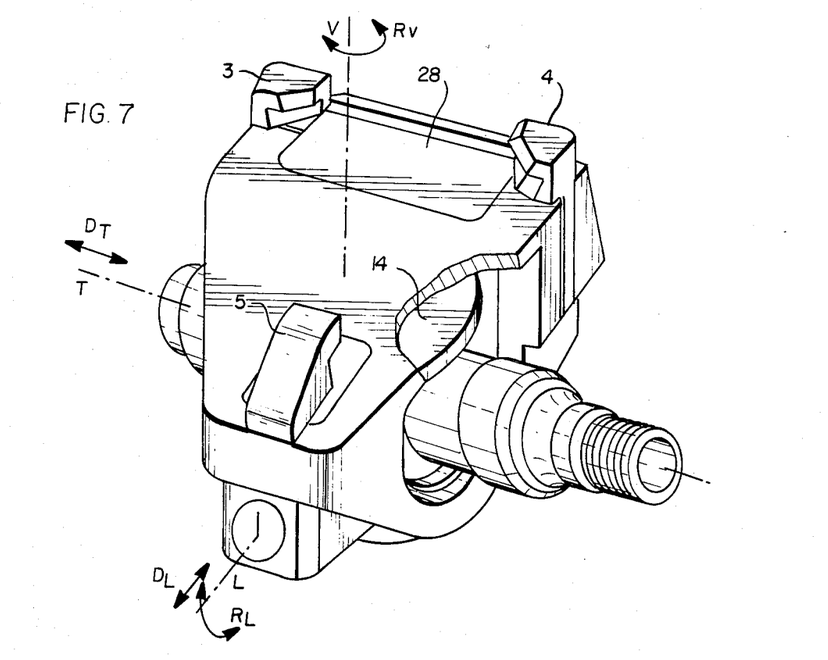
FIG. 7 is a schematic perspective showing the assembled main parts of the pedal.

Moreover, the mechanism 6 acting elastically on the small bars 3a and 4a extending the rear jaws 3 and 4 is shown in FIGS. 5 and 6; these small bars hinge about the longitudinal shafts 30 already mentioned, which consist in this example of cylindrical hollow extensions of the rear plate 2; these extensions 30 contain screws 36 to fix said rear plate 2 to the other part 1 of the pedal body.

The plate 2 by means of its lower part defines a housing containing the mechanism 6 which is designed to act on the small bars 3a and 4a to spread them apart (and therefore acts on the jaws 3 and 4 to bring them closer together).

This mechanism 6 comprises a first elastic assembly consisting of a relatively stiff spring 37 located between two mobile support members 38 and 39 which are kept spaced part by a screw 40. This assembly through the action of one of its support members 39 repels one of the small bars (3a).

The mechanism 6 comprises a second elastic assembly located on the side of the small bar 4a extending the other jaw; this assembly consists of a spring 41 more compliant than the former and located between the support member 38 and a shallow cup 42 pressing against the small bar 4a. In this example, this shallow cup 42 presses against this small bar through the intermediary of a screw 42a for controlling the play.

The shallow cup 42 is designed to come into contact against the support member 38 when the spring 41 has been compressed by a specific amount and has retracted by a specified magnitude.

Thus the more compliant spring 41 is the first to be compressed due to a slight transverse force exerted on the rear jaws 3 and 4; thereby it permits an elastic pivoting motion of these jaws, the low magnitude of this displacement having as its purpose to prevent a release of these jaws 3 and 4 (that is their disengagement with respect to the rear flanges of the shoe coupling).

When the shallow cup 42 comes into contact with the support member 38, the action exerted by the spring 41 is neutralized and it is then the stiffer spring 37 which opposes the rotation of the rear jaws. This rotation would only take place due to a larger transverse force applied which would cause the release of the device and the freeing of the cyclist's foot.

In this example, the support member 38 comprises a small plate 38a located at the tip of the screw 40 to act as a rest means for the spring 41, and a nut 38b screwed onto said screw 40 and acting as a rest means for the spring 37. Such an arrangement permits a prior calibration of the force exerted by the spring 37 (which corresponds to the force required for release).

Moreover the support member 39 comprises a first small plate 39a acting as a rest means for the spring 37 by means of one of its surfaces and holding on its other side a cam 39a cooperating with a mating cam 39b; the latter can be made to pivot by a control knob 43.

In this example, the support member 39 presses against the small bar 3a of the jaw by means of a small plate 39c which eliminates the dangers of rotation by the mating cam when the small bar 3a pivots due to a release force exerted on the jaw 3.

The knob 43, the cam 39a and the mating cam 39b make it possible to displace the first elastic assembly (support member 39, spring 37, screw 40 and support member 38) in order to wedge it if necessary into the position for which the shallow cup 42 makes constant contact both with the small bar 4a and with the support member 38. The more compliant spring 41 then will be neutralized, whereby it is possible to eliminate as desired the slight elastic play it has provided.

The FIGS. 8, 9, 10, 11a and 11b are explanatory schematic views of the pedal adjustments.

Figure 8:
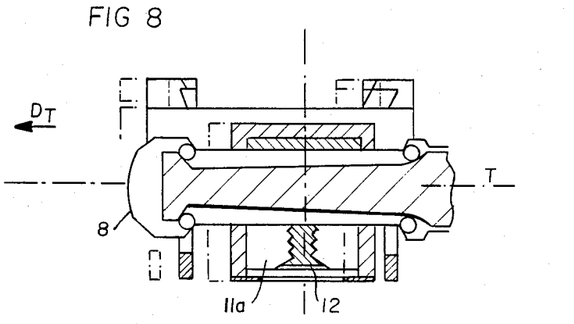
FIG. 8 is a schematic cross-section through the plane B illustrating a first way of adjusting the pedal.

FIG. 8 illustrates the adjustment along the transverse axis (T) (motion $D_T$) with one position diagrammatically shown in solid lines and another in broken lines. This adjustment is carried out by loosening the screw 12, moving the body (1, 2) in sliding manner along the tubular spacer 8 as far as the desired position and retightening the screw 12.

Figure 9:
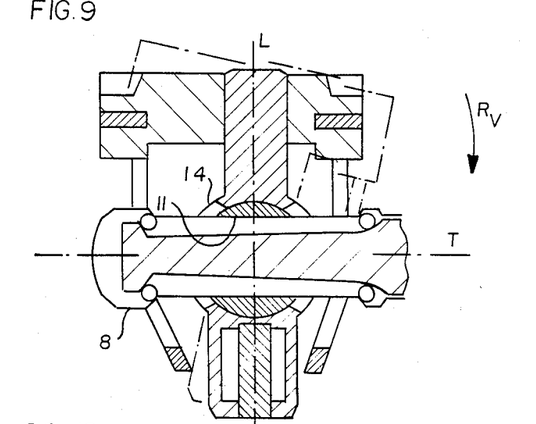
FIG. 9 us a schematic section through the plane C illustrating another way of adjusting the pedal.

FIG. 9 illustrates the adjustment about the orthogonal axis V (movement $R_V$). This adjustment is carried out by loosening the same screw 12, by making the sleeve 14 rotate around the core 11 to the desired angular position, and by retightening the said screw.

Figure 10:
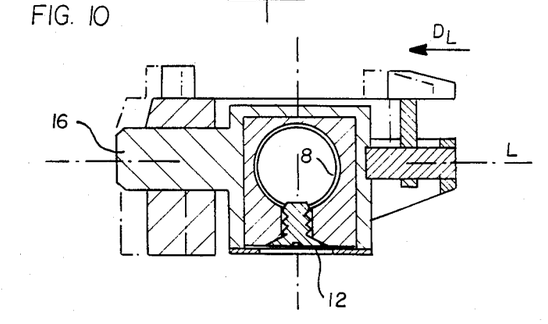
FIG. 10 is a schematic section through the longitudinal plane A illustrating yet another way of adjusting.

FIG. 10 illustrates the adjustment along the longitudinal axis L (motion $D_L$). This adjustment is performed by loosening the screw 35, moving the pedal body 1 in sliding motion along the swivel shafts 15 and 16 and in retightening the screw 35 when in the proper position.

Figure 11A:
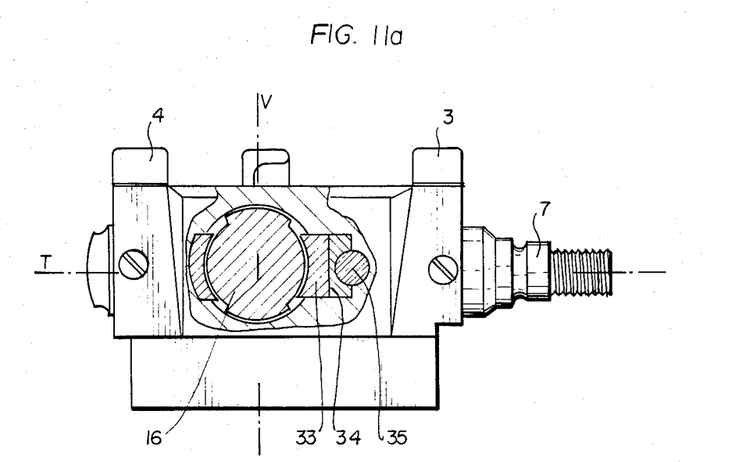
FIG. 11a and 11b are partial cross-sections in a plane D located to the rear of the pedal, illustrating still another way of adjusting the pedal.
Figure 11B:
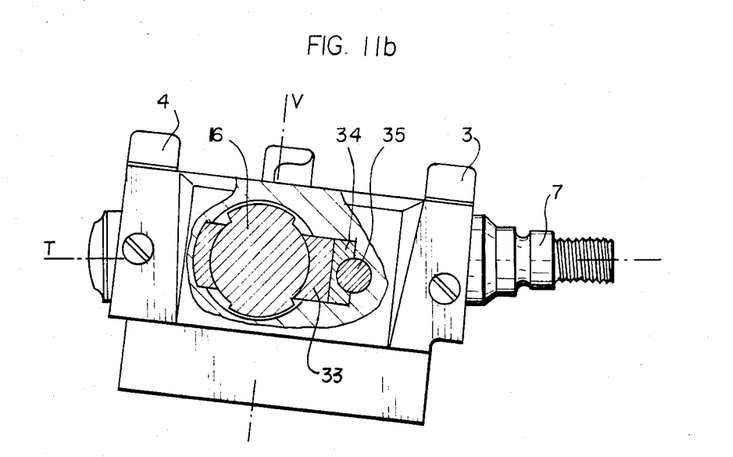

FIGS. 11a and 11b illustrate the adjustment about the longitudinal axis L (motion $R_L$) and show each a different adjusted position. This adjustment is performed by loosening the same screw 35, by making the pedal body pivot about the swivel shafts 15 and 16 and by retightening this screw 35.

Furthermore the FIGS. 12, 13, 14, 15 and 16 show partly and illustratively a shoe for use with the pedal described above; this shoe comprises a sole 50 molded from a "RILSAN" type material in a mold endowing it with the various shapes described below, and with a metal insert 51 partly embedded in this sole.

Figures 12, 13, 14, 15, 16:
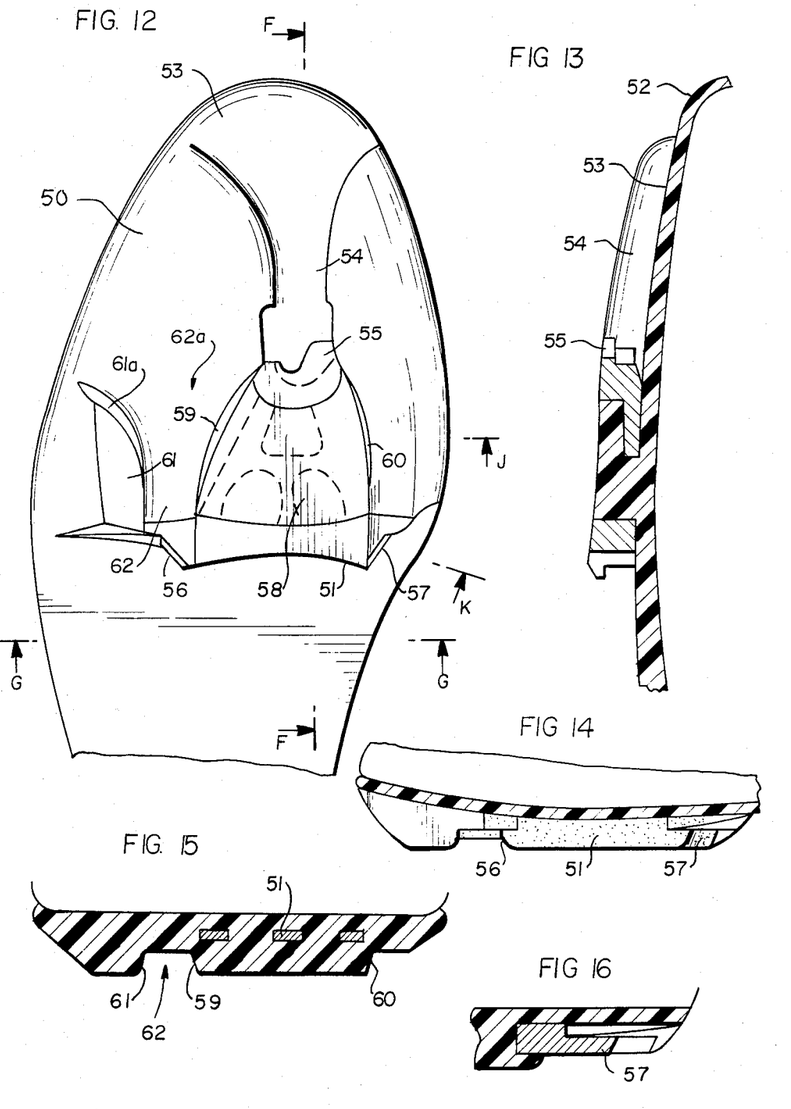
FIG. 12 is a partial topview of s sole from a shoe of the invention, which cooperates with a pedal such as shown in the preceding figures.
FIG. 13 is a partial longitudinal section through a plane FF.
FIGS. 14 and 15 are cross-section resp. through a plane GG and JJ (the visible metal parts of FIG. 15 are dotted to make the figure more comprehensible)
FIG. 16 is a detailed section through a plane K of a coupling flange (a rear jaw in the coupled position being shown in broken lines), FIGS. 17, 18, 19, 20, 21 and 22 schematically illustrate the use of the pedal and of the shoe of the invention (the shoe being assumed transparent for the top views 18 and 22).

The sole 50 is molded in such a manner as to be provided at its fore part 52 with a rounded off longitudinal segment extending continuously as far as a convergent entry 53 of a forward longitudinal glide means 54. The glide means 54 and the entry 53 are formed by material elevations on either side of them.

The metal insert 51 imbedded in the sole is of a suitable shape so as to form on one hand a forward coupling flange 55 located in visible position at the end of the glide means 54 and on the other hand two rear coupling flanges 56 and 57 located at either side of the visible rear part of the insert.

The forward flange 55 in this example is in the shape of a C opening forwardly and with an overhanging lip protruding forward in order to couple with the fore jaw of the pedal. Ahead of said flange 55, the sole forms disengagement recesses at the rim of the glide means 54.

The rear coupling flanges 56 and 57 are oblique to the longitudinal show axis as shown in FIG. 12; each flange comprises a overhanging lip with a sloping side extending backward for the purpose of coupling with one of the rear pedal jaws.

The central part 58 of the sole imbedding the recessed central part of the insert 51 is molded so as to present material elevations for the purpose of forming two guidance flanks 59 and 60 diverging on either side of the fore coupling flange 55 toward the rear coupling flanges 56 and 57.

At the outside of the shoe, the sole forms an additional flank 12 opposite the flank 61; this flank 61 has a forward part 61a which curves toward the outer rim of the shoe so as to constitute together with the flank 59 a glide means 62 with a converging entry 62a for the purpose of guiding the pedal's rear outer jaw.

Due to the combination of the guidance of the fore jaw by the forward glide means 54, of the outer rear jaw by the rear glide means 62 and of the inside rear jaw by the flank 60, the shoe can be easily and rapidly put in the proper place on the pedal as far as the pre-coupling position.

The cooperation between a shoe and a pedal of the invention is illustrated in the FIGS. 17 through 22.

Figure 17:
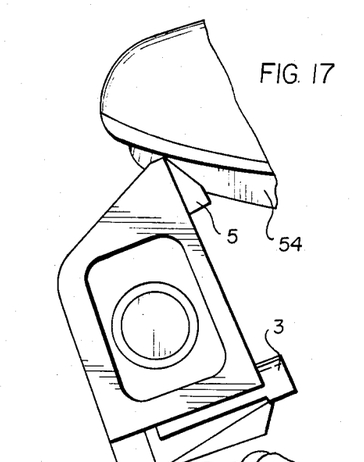
Figure 18:
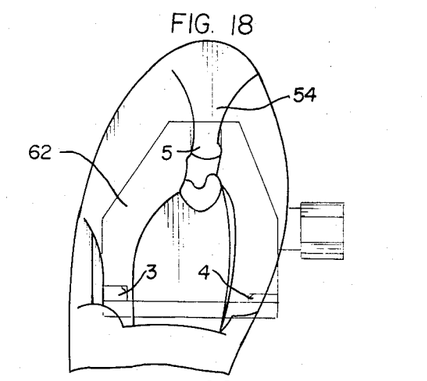
Figures 19, 20:
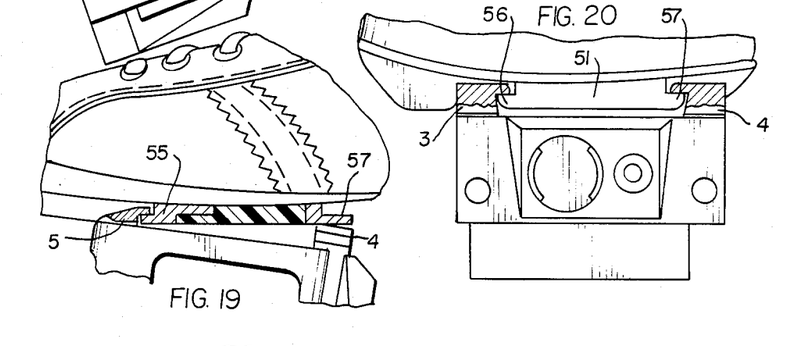
Figure 21:
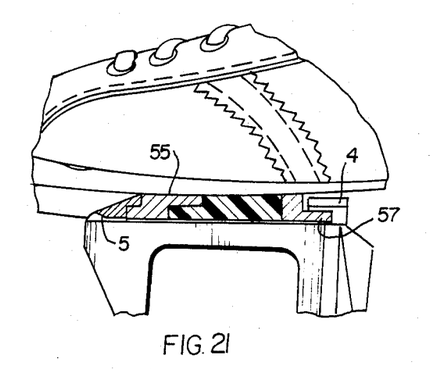

At the beginning of the emplacement, the cyclist rests the rounded-off forward part of the shoe on the pedal and makes the shoe glide forward with respect to the pedal. The fore jaw 5 of the pedal enters the converging entry 53 of the shoe and then is guided by the forward glide means 54 while the external rear jaw 3 enters the convergent entry 62a whereupon it is then guided by the glide means 62 and the rear inside jaw 4 is guided by the guidance flank 60 (FIGS. 17 and 18).

At the end of the gliding motion (FIG. 16), the fore jaw 5 couples with the coupling flange 55 and the rear coupling jaws 56 and 57 move above the corresponding jaws 4 and 3.

Thereupon a downward pressure suffices to achieve cooperation between these flanges and rear jaws (FIGS. 20 and 21) due to the elastic mechanism 6 of the pedal.

Figure 22:
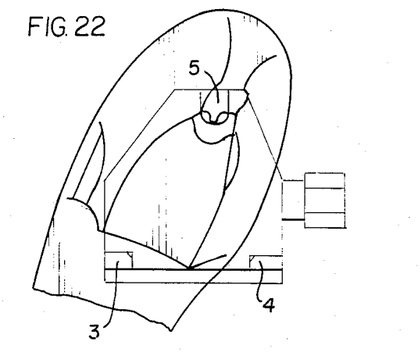

Release is achieved by rotating the foot to the outside as shown in FIG. 22.

Obviously the invention is not restricted to the terms of the above description, but rather extends to all possible variations. For instance the tubular spacer 8 of the pedal can be replaced by any equivalent structure; where appropriate, said spacer and the pedal shaft 7 may be a single shaft, the conventional rotation of the pedal about the acis T being provided by the core 11 mounted in rotational manner with respect to this axis either by means of ball bearings or any other suitable way. In the claims to follow, the tubular spacing 8 and the pedal shaft 7 have been integrated, this set being designated by "pedal shaft (7,8)" and covering any equivalent set.

We claim:

1. A bicycle or the like pedal for securing thereto the shoe of a cyclist, comprising:
   (a) a body;
   (b) first and second jaw means pivotally connected to said body and adapted for cooperatively engaging said shoe for securing said shoe therebetween;
   (c) first and second cooperating spring means associated with said body, said spring means cooperatively acting on said jaw means for pivoting said jaw means into engagement with said shoe; and,
   (d) said first spring means being stiffer than said second spring means whereby said second spring means is adapted for cooperatively pivoting said first and second jaw means through a small arc for maintaining said shoe secured therebetween and said first spring means is adapted for preventing disengagement of said shoe from therebetween by unintended substantial pivoting of said first and second jaw means.

2. The pedal as defined in claim 1, wherein:
   (a) each of said jaw means includes a small bar portion extending a distance below said body;
   (b) first and second spaced interconnected movable support members associated with said body, each of said support members associated with a small bar portion of said jaw means;
   (c) said first spring means coaxially disposed between and acting on said support members;
   (d) cup means coaxially displaceably disposed adjacent to and spaced from said second support member, said cup means includes a portion thereof engaging said small bar portion of said second jaw means for pivoting said second jaw means; and,
   (e) said second spring means is coaxially disposed between said second support member and said cup means whereby said cup means is adapted for engaging said second support member upon a pre-selected compression of said second spring means.

3. The pedal as defined in claim 2, wherein:
   (a) control knob means connected to said first support member and adapted for cooperatively displacing said support members a pre-selected distance whereby said second support member engages said cup means for thereby neutralizing said second spring means.

4. The pedal as defined in claim 1, wherein:
   (a) said body is generally planar and has a front portion and a rear portion;
   (b) said first and second jaw means are connected to said rear portion at generally the outer edges thereof and each of said jaw means has a portion extending below said body;
   (c) said first and second spring means are disposed below said body for engaging said portions of said jaw means; and,
   (d) a coupling jaw means is disposed on said front portion and adapted for cooperating with said first and second jaw means for thereby providing a triangular coupling system.

5. The pedal as defined in claim 4, wherein:
   (a) each of said jaw means portions includes a small bar;
   (b) first and second shaft means are each connected to one of said jaw means and pivotally associated with said body for thereby permitting pivoting of said jaw means; and,
   (c) said rear portion includes a rear plate connected to said front portion for providing a housing for said first and second spring means and said first and second jaw means are connected to said rear plate.

6. The pedal as defined in claim 5, wherein:
   (a) shim means are disposed between said front portion and said rear plate for permitting longitudinal adjustment of said first and second jaw means with said coupling jaw means.

7. The pedal as defined in claim 4, wherein:
   (a) a sleeve is secured to said body at the underside thereof:
   (b) a core piece displaceably engages said sleeve and is adapted for displaceably engaging a pedal shaft of said bicycle;
   (c) first locking means are associated with said sleeve and said core piece and are adapted for permitting displacement of said body along an axis transverse of said pedal shaft;
   (d) second lockaing means are associated with said sleeve and said core piece and are adapted for permitting displacement of said body along an axis longitudinal of said pedal shaft; and,
   (e) said second locking means are further adapted for permitting pivoting displacement of said body on an axis orthogonal of said pedal shaft.

8. The pedal as defined in claim 7, wherein:
   (a) said core piece and said sleeve are each displaceable relative to the other; and,
   (b) said core piece and said sleeve are each independently displaceable about said longitudinal axis for thereby permitting pivoting of said body thereabout.

9. The pedal as defined in claim 8, wherein:
   (a) means are associated with said core piece for permitting swiveling of said core piece about said orthogonal axis;
   (b) guide means are associated with said sleeve for longitudinally guiding said body; and,
   (c) said body is displaceably mounted to said guide means.

10. The pedal as defined in claim 9, wherein:
    (a) said guide means includes opposed forwardly and rearwardly extending swivel shafts secured to said sleeve;
    (b) said body is longitudinally displaceably mounted to said swivel shafts; and, (c) said body is adapted for pivoting around said swivel shafts.

11. The pedal as defined in claim 10, wherein:
(a) a tubular spacer is mounted to said pedal shaft;
(b) a first lock member is associated with said core piece for securing said core piece to said spacer at a pre-selected position thereon;
(c) said first lock member is further adapted for locking said sleeve to said core piece at a pre-selected position about said orthogonal axis;
(d) a second lock member is adapted for locking said body at a pre-selected longitudinal position on said swivel shafts; and,
(e) said second lock member is further adapted for locking said body at a pre-selected position about said longitudinal axis.

12. The pedal as defined in claim 11, wherein:
(a) said first lock member includes a screw having a stem thereof engaging said tubular spacer;
(b) said core piece includes a transverse slit having oblique edges on either side thereof; and,
(c) said screw includes a conical head housed in said slit for clamping said core piece to said spacer and for radially spreading said core piece for thereby locking said core piece to said sleeve.

13. The pedal as defined in claim 11, wherein:
(a) said second lock member includes two locking wedges housed in said body and adapted for engaging opposite sides of said rear swivel shaft for locking said body thereto;
(b) a movable clamping wedge is connected to one of said locking wedges and is adapted for contacting said one of said two locking wedges for causing engagement thereof with said rear swivel shaft; and,
(c) a control screw operatively engages said movable clamping wedge and is associated with said body for displacing said movable clamping wedge for thereby adjusting said one of said two locking wedges.

14. The pedal as defined in claim 4, further comprising:
(a) said shoe includes a sole having a body contacting lower surface and a front and rear portion;
(b) a forward coupling flange is connected to said front portion and is adapted for coupling with said coupling jaw means;
(c) first and second rear coupling flanges are connected to said rear portion and are adapted for coupling with said first and said second jaw means; and,
(d) first and seocnd guidance flanks extend generally outwardly and rearwardly from generally said forward coupling flange and are adapted for guiding said first and second rear coupling flanges into engagement with said first and second jaw means as said shoe is secured to said body.

15. The pedal as defined in claim 14, wherein:
(a) a supplementary guidance flank is connected to said sole generally adjacent to an outer one of said first and second guidance flanks for providing a glide means for said associated jaw means; and,
(b) said supplementary guidance flank includes a forward portion and a convergent entry portion for said jaw means.

16. The pedal as defined in claim 14, wherein:
(a) a longitudinal guide means is connected to said front portion and aligned with said forward coupling flange for guiding said coupling jaw means thereto;
(b) said longitudinal guide means includes a convergent entry portion cooperating with said coupling jaw means; and,
(c) said sole has a rounded off longitudinal forward portion extending to said longitudinal guide means convergent entry portion.

* * * * *